UNITED STATES PATENT OFFICE.

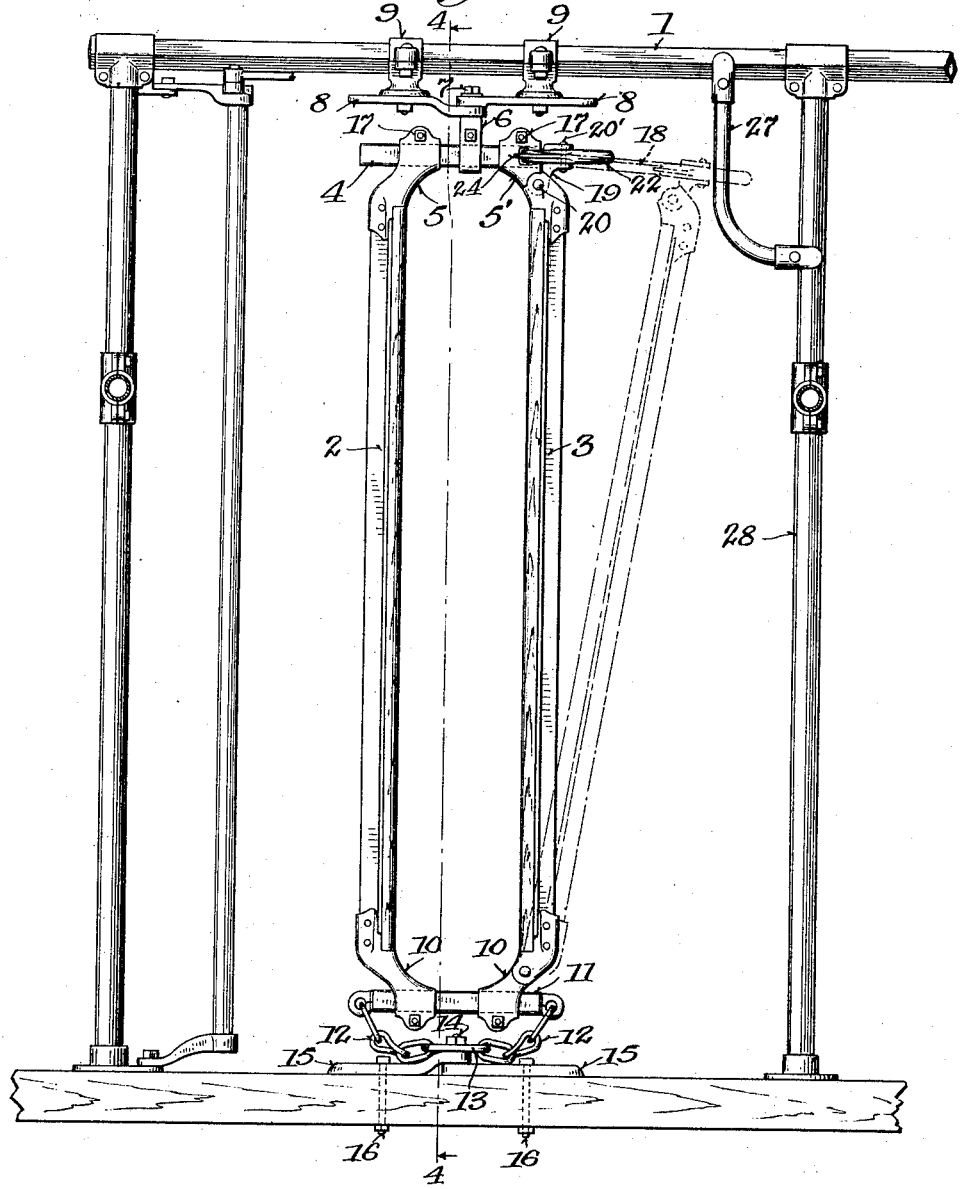

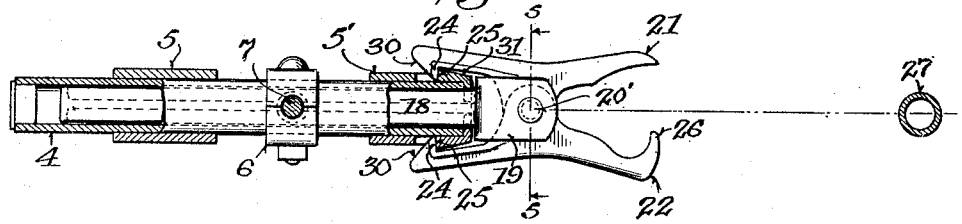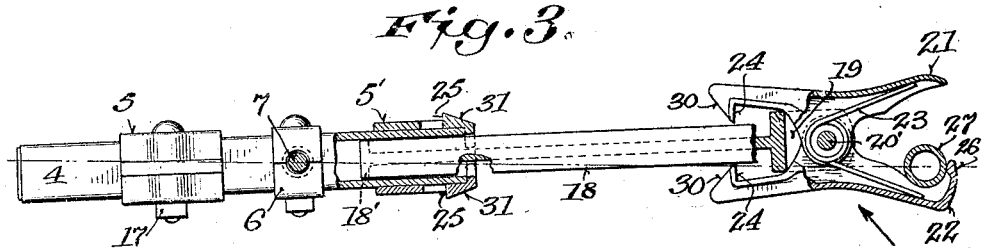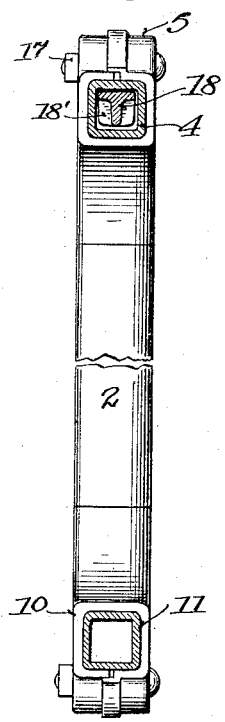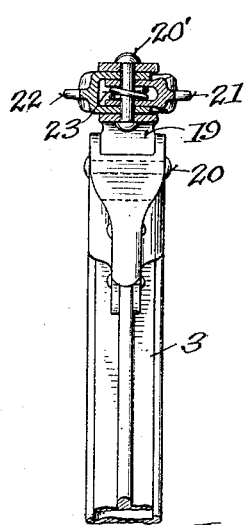

JOHN B. OLSON, OF FORT ATKINSON, WISCONSIN, ASSIGNOR TO JAMES MANUFACTURING COMPANY, OF FORT ATKINSON, WISCONSIN, A CORPORATION OF WISCONSIN.

ADJUSTABLE CATTLE-STANCHION.

1,364,405.

Specification of Letters Patent.

Patented Jan. 4, 1921.

Application filed August 30, 1916. Serial No. 117,587.

*To all whom it may concern:*

Be it known that I, JOHN B. OLSON, a citizen of the United States, residing at the city of Fort Atkinson, county of Jefferson, and State of Wisconsin, have invented new and useful Improvements in Adjustable Cattle-Stanchions, of which the following is a specification.

My invention relates to improvements in cattle stanchions.

The object of my invention is, first, to provide a stanchion by which both of the vertical cattle retaining bars may be readily adjusted and held nearer to or farther from each other as may be required to conform to the necks of various sizes of cattle confined thereby; second, to provide a simple and efficient device for adjusting the bars of a pair of stanchions at equal distances from a supporting hanger, either by moving both stanchion bars an equal distance toward the right and left or by moving one of said bars and then adjusting the support relatively in the same direction one half of the distance, whereby the stanchion may be kept balanced, the support being directly over the center of gravity; third, to provide a device for holding the inclined member of a pair of stanchion bars, when opened or inclined, in a fixed position in relation to the next adjacent standard, whereby the cattle are prevented from closing the inclinable member of such stanchions or from turning the stanchion rotatively or moving such inclinable member in any manner so as to allow the animal to pass its head into the space between said inclinable stanchion bar and the next adjacent standard instead of inserting it properly between the stanchion bars; fourth, to provide improved means for movably connecting the upper end of the inclinable stanchion bar with the relatively fixed portions of the stanchion, whereby the inclinable bar may be guided and its movement limited, and fifth, to provide improved latch mechanism, including a plurality of independently operating automatic latches which may be grasped in one hand and simultaneously retracted, but which can not be simultaneously retracted by any form of pressure which cattle can exert; said latch mechanism being utilized to not only hold the inclinable stanchion bar in a vertical animal securing position but also to coöperate with fixed portions of the stanchion frame in holding the inclinable bar in fixed relation to the next adjacent frame standard when in open position.

My invention is further explained by reference to the accompanying drawings, in which—

Figure 1 represents a front view, showing my improved stanchions in connection with a stanchion supporting frame.

Fig. 2 is a plan view, part in section, of the stanchion retaining mechanism as it appears when the inclinable stanchion bar is in its closed position.

Fig. 3 is a similar view to that shown in Fig. 2 as it appears with the inclinable bar in its opened or inclined position.

Fig. 4 is a vertical section, drawn on line 4, 4 of Fig. 1, looking toward the left, and Fig. 5 is a vertical section, drawn on line 5, 5 of Fig. 2, showing the manner of pivotally connecting the locking dogs with the upper end of the inclinable stanchion bar.

Like parts are referred to by the same reference numerals throughout the several views.

1 is a stanchion supporting frame with which the vertical stanchion bar 2 and inclinable bar 3 are connected at their upper ends by the horizontal connecting bar 4, slide 18, members 5 and 5', central hanger 6, pivotal bolt 7, links 8, 8 and clamping members 9, 9, and at their lower ends by the members 10, 10, horizontal bar 11, chains 12, 12, plate 13, bolt 14, links 15, 15 and bolts 16, 16.

The upper connecting bar 4 is normally rigidly secured to the upper end of the relatively stationary stanchion bar 2, to which it is secured by a clamping member 5 and a clamping bolt and nut 17. The bars 4 and 11 are of sufficient length to permit a longitudinal adjustment of member 5 thereon, and if desired, a similar adjustment of the head piece 5' and clamping members 10 may be permitted, although the head piece 5' will ordinarily remain in a permanent, fixed relation to one end of the bar 4.

It will be understood that when adjusting the stanchion bars 2 and 3 nearer to or farther from each other as may be required for cattle of different sizes, such object may be attained either by loosening the nuts 17, 17 and sliding such bars toward or from the central member 6, or one of said stanchion bars 2 or 3 may be moved toward the right or left, and the member 6 is then moved and adjusted on said horizontal member 4 centrally between said stanchion bars 2 and 3, whereby said bars will, when thus adjusted, always counter-balance each other and will always be retained at a uniform distance from a common center between the members 9, 9 from which they are suspended as previously described. The inclinable stanchion bar 3 is pivotally connected at its upper end to the slide bar 18. Bar 4 is hollow. Slide 18 is T shaped in cross section, and is arranged with one vertical and two horizontal flanges which pass through a T slot in the end of member 5'. A head 18' prevents a complete withdrawal of the slide, but otherwise the slide is free to move inwardly and outwardly from the end of bar 4 and is adapted to be drawn outwardly as said inclinable bar is moved from the vertical position shown in Fig. 1 to that indicated by dotted lines in said figure. The outer end of said slide bar 18 is pivotally connected with said inclinable stanchion bar by the bracket 19 and pivotal bolt 20. A bolt 20' serves to connect a pair of latch dogs 21 and 22 with the bracket, and a spring 23 is coiled about said bolt and arranged with its ends engaging the latch handles in spreading relation thereto, whereby both of the latch hooks are normally held in locking position.

When the inclinable bar 3 is brought to the vertical position shown in Fig. 1, the hooks 24, 24 of said latch dogs are adapted to engage the retaining lugs 25, 25 formed on the respective sides of the member 5', whereby said inclinable bar 3 is retained in its vertical position. But when it is desired to open the stanchion said hooks 24, 24 are simultaneously disengaged from the lugs 25, 25 by the manual act of pressing together the handles 21 and 22 against the tension of the spring 23. When this is done, the inclinable bar and connected slide 18 may be moved toward the right, to the position indicated by dotted lines in Fig. 1, in which position a corner brace 27 is received between the latch handles. The latch handle on the side opposite the manger is provided with an inturned extremity which constitutes a hook 26, adapted to engage the corner brace and prevent the bar 3 from being pushed inwardly toward the other bar by the animal. The bar 3 is therefore securely retained in its inclined position, and cattle are prevented from either forcing said inclinable bar 3 back to the vertical position or from turning the stanchions and entering the space between such stanchions and the vertical standard 28.

It will be obvious that by thus pivotally connecting a plurality of latches 21 and 22 with the slide 18, one of said latches will, when the bar 3 is in normal closed position, always be retained in engagement with one of the laterally projecting catches 25 formed on the member 5', regardless of the direction in which pressure may be applied to the latch mechanism by any animal in the stable, for no such animal will be able to retract more than one latch at a time.

The slide 18 is provided with a cross head 29 at its outer end from which bracket 19 extends, and this has sufficient transverse dimensions to hold the latch hooks a predetermined distance apart even if the points of the hooks do not engage the horizontal flanges of the slide. The hooked extremities of the latches are obliquely faced at 30, being inclined in the direction of the points of the hooks 24 toward the pivot bolt 20'. The lugs 25 also preferably have their outer faces 31 tapered toward the extremity of member 5', whereby, when the latches move inwardly to locking position the hooks 24 will be automatically spread upon coming into contact with the lugs 25 until the latch hooks pass over the lugs to a position for engagement therewith.

Having thus described my invention what I claim as new and desire to secure by Letters Patent, is:

1. The combination with an inclinable stanchion bar, a set of spring actuated latch dogs pivotally connected therewith, a relatively stationary stanchion member provided with a head adapted to be engaged by said dogs, an extensible guide in sliding connection with the head, and also connected with the inclinable stanchion bar, said guide being adapted to control the movement of the dogs and direct them into engagement with the head when the inclinable stanchion bar is moved to closed, animal retaining position, said dogs being provided with handles, whereby they may be manually released but not inadvertently simultaneously released.

2. The combination of relatively stationary and inclinable stanchion bars, a connecting head bar, a supporting coupling member adjustable along the head bar to balance the stanchion, clamping means for rigidly securing the relatively stationary bar adjustably along the head bar, and telescoping means for coupling the inclinable stanchion bar to the head bar, said coupling means being adjustable along the head bar independently of the clamping means, and said telescoping means being provided with latch mechanism adapted to lock to the head bar in one position, regardless of said adjustments.

3. The combination with a pair of stanchion bars, of a connecting bar having one end adjustably secured to the upper end of one of said stanchion bars and having its other end adapted for predetermined adjustable latch connection with the other bar, said latch connection always operating at a predetermined adjustable point, a hanger in independently adjustable connection with the connecting bar and adapted to support the same from a stanchion frame, whereby the connecting bar may be adjusted to vary the spacing of the stanchion bars and a corresponding adjustment permitted with reference to its connection with the stanchion supporting frame for balancing purposes.

4. The combination of a pair of stanchion bars, a hollow bar connected with the upper end of one of said stanchion bars, a slide bar adapted to be telescoped within said hollow bar, and connected with the upper end of the other stanchion bar, a pair of dogs connected with the outer ends of said slide bar, a pair of handles formed integral with said dogs, a pivotal bolt connecting said dogs and handles with said slidable bar, a spring interposed between said handles and adapted by its recoil to spread said handles and throw said dogs into locking engagement with said relatively stationary bar, whereby said inclinable stanchion bar is locked and retained when closed in its vertical position.

5. The combination of a pair of stanchion bars one of said bars being relatively stationary and the other inclinable, a hollow bar adjustably connected with the upper end of one of said stanchion bars, a slide bar adapted to be telescoped within said hollow bar, a pair of dogs connected with the outer end of said slidable bar, a pair of handles formed integral with said dogs, a pivotal bolt connecting said dogs and handles with said slidable bar, a spring interposed between said handles and adapted by its recoil to spread said handles and throw said dogs into locking engagement with said stationary stanchion bar, whereby said inclinable stanchion bar is locked and retained when closed in its vertical position, a hook formed upon the end of one of said handles, said hook being adapted when said stanchion bar is in its inclined position to engage said stationary member and prevent said inclinable bar from being accidentally moved from its inclined position.

6. The combination with a pair of stanchion bars having their lower ends in hinged connection with each other, a hanger, an upper connecting bar adjustably clamped to the upper end of one of the stanchion bars, and having independently adjustable connection with the hanger, said connecting bar being adapted for sliding adjustments across said stanchion bar and hanger when the clamping connections are released, a telescoping slide pivotally connected with the upper end of the other stanchion bar, and adapted to move longitudinally of the connecting bar, and to engage the end portion thereof in the extended position, a latch mechanism adapted, when the slide is moved inwardly, to automatically engage and interlock with said connecting bar at a predetermined adjustable point thereon, said slide being adapted to hold the latch mechanism in a position adapted for such automatic interlocking engagement when the slide is extended.

7. A stanchion comprising a pair of stanchion bars having their lower ends in hinged connection with each other, a supporting hanger, means for adjusting said bars to increase or diminish the space between them at both ends thereof, and while in closed animal retaining position, means for independently adjusting the hanger along the portion of the stanchion to which it is connected to balance the stanchion, a slide pivotally connected with one of the bars, and adapted to allow such bar to swing to an inclined open position with reference to the other, and locking devices for securing the slide in retracted position, and adapted to engage the slide when in extended position, whereby the slide supports the locking devices in position for automatic locking action when the slide is retracted.

8. The combination with a pair of stanchion bars, of a supporting hanger and connecting bar in adjustable clamping relation to the hanger and to one of the stanchion bars and adapted for latch connection with the other stanchion bar, a set of oppositely disposed latches extending across the upper end of the other stanchion bar and pivotally connected therewith, each of said latches being adapted to engage the connecting bar, and a slide connected with the latch supporting bar and movably engaging the connecting bar in all positions of bar adjustment.

9. The combination with a stanchion supporting frame, of a set of stanchion bars operatively connected to the upper and lower frame bars, one of said stanchion bars being connected to swing laterally, a corner brace for the stanchion supporting frame, and means for engaging said swinging stanchion bar with the corner brace when in laterally swung open position.

10. The combination with a stanchion supporting frame, of a set of stanchion bars operatively connected to the upper and lower frame bars, one of said stanchion bars being connected to swing laterally, a corner brace for the stanchion supporting frame, and means for engaging said swinging stanchion bar with the corner brace when in laterally swung open position, said brace engaging means including a set of pivoted latch operating handles carried by said swinging bar in a position to straddle said corner brace, one of said handles being provided with a hook adapted to engage back of said brace to prevent accidental inwardly swinging movement of said bar.

11. The combination of a pair of stanchion bars, a connecting bar secured to the upper end of one of the stanchion bars, a pair of latches pivotally connected with the other stanchion bar, a slide bar movably engaging the connecting bar and positioned between said latches, and a head piece on the connecting bar provided with catches adapted to be engaged by said latches, said slide being adapted to hold the latches in position for automatic engagement with the head of the catches thereon when the slide is being moved from extended position to retracted position.

12. The combination of a set of relatively stationary and inclinable stanchion bars, of a connecting bar secured to the upper end of the relatively stationary stanchion bar, a slide secured to the inclinable stanchion bar and movably engaging the connecting bar, spring actuated latch mechanism including latches upon opposite sides of said slide for coupling the inclinable bar to the connecting bar when the slide is in retracted position, and means connected with the slide for limiting the movement of the latch when the slide is extended, whereby the latch is held in a position for automatically locking the stanchion members together when the slide is in retracted position.

In testimony whereof I affix my signature in the presence of two witnesses.

JOHN B. OLSON.

Witnesses:
JOHN G. SHODRON,
ROBT. J. PARKS.